(12) United States Patent
Tomoda

(10) Patent No.: US 9,778,894 B2
(45) Date of Patent: Oct. 3, 2017

(54) SYSTEM AND METHOD FOR OUTPUTTING EXTENDED DISPLAY IDENTIFICATION DATA TO ANOTHER ELECTRONIC DEVICE TO ACHIEVE POWER SAVINGS

(71) Applicant: Kabushiki Kaisha Toshiba, Minato-ku, Tokyo (JP)

(72) Inventor: Ichiro Tomoda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 48 days.

(21) Appl. No.: 14/692,489

(22) Filed: Apr. 21, 2015

(65) Prior Publication Data

US 2015/0378413 A1 Dec. 31, 2015

Related U.S. Application Data

(60) Provisional application No. 62/018,895, filed on Jun. 30, 2014.

(51) Int. Cl.
*G06F 1/26* (2006.01)
*G06F 3/14* (2006.01)
(Continued)

(52) U.S. Cl.
CPC ............ *G06F 3/14* (2013.01); *G06F 1/3265* (2013.01); *G09G 3/003* (2013.01); *H04N 21/43635* (2013.01); *H04N 21/4424* (2013.01); *H04N 21/4436* (2013.01); *H04N 21/44218* (2013.01); *H04N 21/4516* (2013.01); *G09G 5/006* (2013.01); *G09G 2330/021* (2013.01); *G09G 2340/0407* (2013.01); *G09G 2340/0435* (2013.01); *G09G 2340/0492* (2013.01); *G09G 2340/12* (2013.01); *G09G 2354/00* (2013.01); *G09G 2370/04* (2013.01);
(Continued)

(58) Field of Classification Search
CPC .......... G06F 1/3265; G06F 1/28; G06F 1/263; G06F 3/14
See application file for complete search history.

(56) References Cited

U.S. PATENT DOCUMENTS

2004/0002366 A1* 1/2004 Cromer ............. H04W 52/0261
455/574
2005/0052528 A1* 3/2005 Ohkawa ................. H04N 7/147
348/14.08

(Continued)

FOREIGN PATENT DOCUMENTS

| JP | 2004-126437 A | 4/2004 |
|---|---|---|
| JP | 2008-205833 A | 9/2008 |
| JP | 2010-009695 A | 1/2010 |

*Primary Examiner* — Thomas Lee
*Assistant Examiner* — Vincent Chang
(74) *Attorney, Agent, or Firm* — Knobbe, Martens, Olson & Bear, LLP

(57) ABSTRACT

According to an embodiment, an electronic device is configured to output extended display identification data (EDID) to another electronic device, and to receive image data corresponding to the EDID from the other electronic device. The electronic device includes a memory and a controller. The memory is configured to store therein a plurality of distinct types of EDID. The controller is configured to detect a condition of a power source supplied to the electronic device, and to select an EDID corresponding to the condition.

9 Claims, 8 Drawing Sheets

(51) Int. Cl.
*G06F 1/32* (2006.01)
*H04N 21/4363* (2011.01)
*G09G 3/00* (2006.01)
*H04N 21/442* (2011.01)
*H04N 21/443* (2011.01)
*H04N 21/45* (2011.01)
*G09G 5/00* (2006.01)

(52) U.S. Cl.
CPC ... *G09G 2370/047* (2013.01); *G09G 2370/12* (2013.01); *G09G 2370/20* (2013.01); *Y02B 60/1242* (2013.01)

(56) References Cited

U.S. PATENT DOCUMENTS

| | | | |
|---|---|---|---|
| 2006/0125959 A1* | 6/2006 | Yoshizawa | H04N 5/44513 348/569 |
| 2011/0199931 A1* | 8/2011 | Anderson | H04L 29/06027 370/252 |
| 2012/0038655 A1* | 2/2012 | Kang | G09G 5/006 345/530 |
| 2014/0118240 A1* | 5/2014 | Pais | G09G 3/00 345/156 |
| 2014/0169484 A1* | 6/2014 | Jung | H04N 19/172 375/240.29 |
| 2015/0156424 A1* | 6/2015 | Chen | H04N 5/265 348/588 |

* cited by examiner

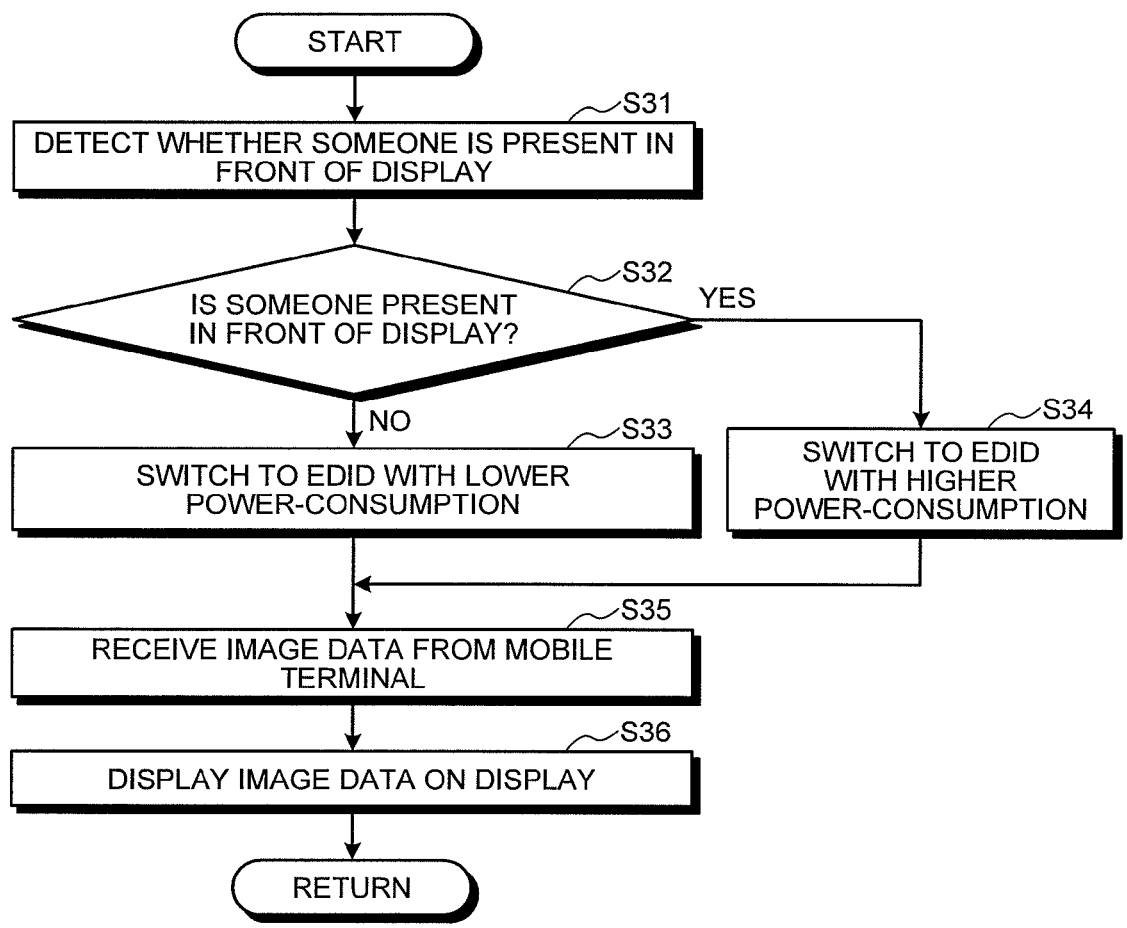

SYSTEM AND METHOD FOR OUTPUTTING EXTENDED DISPLAY IDENTIFICATION DATA TO ANOTHER ELECTRONIC DEVICE TO ACHIEVE POWER SAVINGS

CROSS-REFERENCE TO RELATED APPLICATIONS

This application claims the benefit of U.S. Provisional Patent Application No. 62/018,895, filed Jun. 30, 2014, the entire contents of which are incorporated herein by reference.

FIELD

The embodiments described herein relate generally to an electronic device.

BACKGROUND

Conventionally, there have been known techniques of connecting an external display device to a mobile device and transmitting image data from the mobile device to the display device.

In the above techniques, power saving has been required.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 13 is an exemplary flowchart for explaining processing executed by a controller of the display device in the third embodiment.

DETAILED DESCRIPTION

According to an embodiment, an electronic device is configured to output extended display identification data (EDID) to another electronic device, and to receive image data corresponding to the EDID from the other electronic device. The electronic device comprises a memory and a controller. The memory is configured to store therein a plurality of distinct types of EDID. The controller is configured to detect a condition of a power source supplied to the electronic device, and to select an EDID corresponding to the condition.

Embodiments will now be described in detail with reference to the drawings.

First Embodiment

The schematic configuration of a display device 100 according to a first embodiment will be described with reference to FIGS. 1 to 4. The display device 100 is an example of an "electronic device".

The display device 100 is an external display terminal connected to a mobile terminal 200 such as a smart phone. The display device 100 is configured to be capable of outputting image and voice data input from the mobile terminal 200. The following is an example where image data is transmitted and received via data communication complying with the high-definition multimedia interface (HDMI) specification. The image data may be transmitted and received via data communication complying with another specification such as Digital Visual Interface (DVI), Display Port, and the like.

Figure 1:
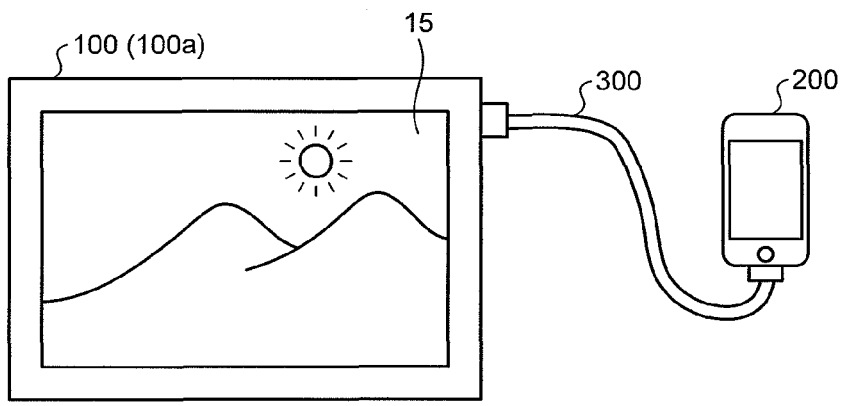
FIG. 1 is an exemplary diagram illustrating the appearance of a display device and a mobile terminal according to a first embodiment.
Figure 2:
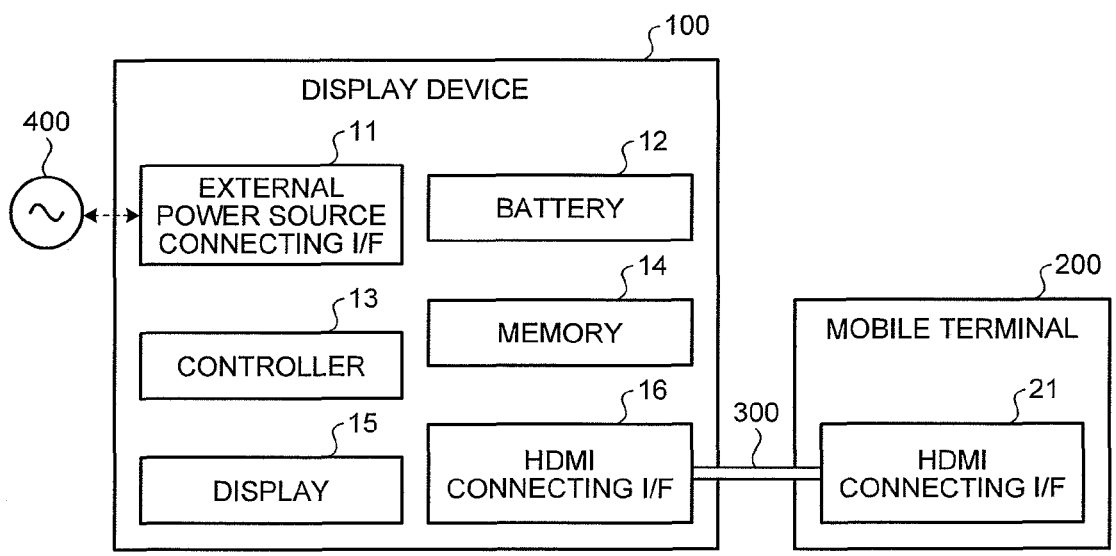
FIG. 2 is an exemplary block diagram illustrating the respective internal configurations of the display device and the mobile terminal in the first embodiment.

As FIGS. 1 and 2 illustrate, the display device 100 is connected to the mobile terminal 200 via an HDMI cable 300.

As FIG. 2 illustrates, the display device 100 includes, as main components, an external power source connecting interface (I/F) 11, a battery 12, a controller 13, a memory 14, a display 15, and an HDMI connecting I/F 16.

The external power source connecting I/F 11 is configured to be capable of connecting to an alternating-current (AC) power source 400 serving as an external power source. The battery 12 is configured to be capable of storing electricity supplied from the AC power source 400 and others.

The controller 13 is configured to execute various kinds of computer programs for controlling each component of the display device 100. The memory 14 is configured to store therein, for example, various kinds of computer programs executed by the controller 13 and various kinds of data used when such computer programs are executed.

The display 15 is configured to display images including a still image and a video image based on image data input from the mobile terminal 200. The HDMI connecting I/F 16 is configured to be capable of connecting to an end of the HDMI cable 300. The opposite end of the HDMI cable 300 to the end connected to the display 15 (the HDMI connecting I/F 16) is connected to an HDMI connecting I/F 21 of the mobile terminal 200. FIG. 2 illustrates only the HDMI connecting I/F 21 as a hardware configuration of the mobile terminal 200; however, other than the HDMI connecting I/F 21, the mobile terminal 200 includes various kinds of hardware and software necessary to exert functions as a mobile information processing terminal.

In the above-described configuration where image data is transmitted and received between different devices, a device (a source device) transmitting the image data needs to preliminarily acquire characteristic information in order to transmit appropriate image data, the characteristic information indicating types of image data that a device (a sink device) receiving the image data can receive. Examples of the characteristic information include extended display identification data (EDID). EDID includes information such as the resolution and the frame rate of image data that can be received by the sink device.

In the first embodiment, the display device 100 serving as a sink device is configured to transmit EDID to the mobile terminal 200 serving as a source device in advance of receiving image data from the mobile terminal 200. When the mobile terminal 200 receives the EDID from the display device 100, the mobile terminal 200 is configured to transmit image data with resolution and a frame rate corresponding to the EDID to the display device 100. The HDMI connecting I/F 16 and the HDMI connecting I/F 21, which are components to transmit and receive EDID, will now be described in detail with reference to FIG. 3.

Figure 3:
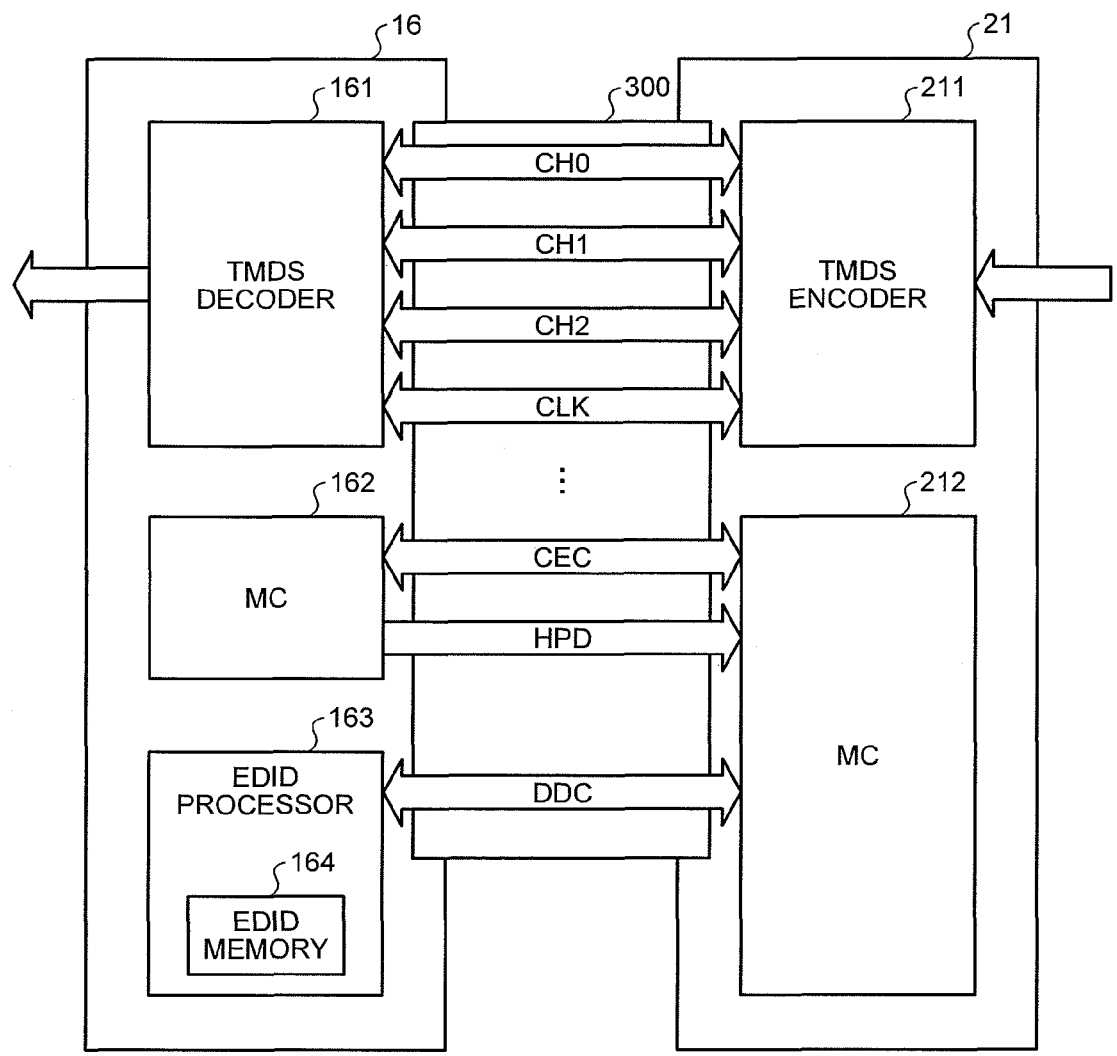
FIG. 3 is an exemplary block diagram illustrating the internal configurations of respective high-definition multimedia interface (HDMI) connecting interfaces (I/Fs) of the display device and the mobile terminal in the first embodiment.

As FIG. 3 illustrates, the HDMI connecting I/F 16 includes a transition minimized differential signaling (TMDS) decoder 161, a microcomputer (MC) 162, and an EDID processor 163. The HDMI connecting I/F 21 includes a TMDS encoder 211 and an MC 212.

The TMDS encoder 211 is configured to encode image data in the mobile terminal 200 into a format corresponding to the EDID, and to transmit the encoded image data to the TMDS decoder 161. The TMDS decoder 161 is configured to decode the image data transmitted from the TMDS encoder 211. Image data is transmitted and received between the TMDS encoder 211 and the TMDS decoder 161 via lines CH0 to CH2, a CLK line, and others included in the HDMI cable 300.

The MC 162 and the MC 212 transmit and receive a consumer electronics control (CEC) signal used for mutual control between devices via a CEC line. The MC 162 in the sink device (the display device 100) outputs, via a hot-plug detect (HPD) line, an HPD signal indicating that the display device 100 is in a receivable condition for image data transmitted from the source device (the mobile terminal 200).

The EDID processor 163 outputs EDID stored in an EDID memory 164 to the MC 212 via a display data channel (DDC) line after the MC 162 outputs the HPD signal to the MC 212. The HDMI cable 300 includes other lines such as a +5V line (not illustrated in FIG. 3) for supplying electricity than the above-described lines CH0 to CH2, CLK line, CEC line, HPD line, and DDC line.

In the first embodiment, the EDID memory 164 stores therein two types of EDID different from each other. The two types of EDID specifically denote high power-consumption EDID and low power-consumption EDID.

The high power-consumption EDID indicates comparatively high resolution and a comparatively high frame rate. When image data based on the high power-consumption EDID is displayed on the display 15, the power consumption of the display device 100 becomes comparatively high.

The low power-consumption EDID indicates lower resolution and a lower frame rate than those indicated by the high power-consumption EDID. When image data based on the low power-consumption EDID is displayed on the display 15, the power consumption of the display device 100 is decreased compared with the above-described case where image data based on the high power-consumption EDID is displayed.

In the first embodiment, the controller 13 is configured to detect a condition of a power source supplied to the display device 100, and to switch EDID output to the mobile terminal 200 based on the condition so that the power consumption is adjusted to the condition. In specific, the controller 13 is configured to detect whether the power source is supplied from the AC power source 400 or from the battery 12. When the power source is supplied from the AC power source 400, the controller 13 is configured to select the high power-consumption EDID as the EDID output to the mobile terminal 200. When the power source is supplied from the battery 12, the controller 13 is configured to select the low power-consumption EDID as the EDID output to the mobile terminal 200. The functional configuration of the controller 13 will now be described with reference to FIG. 4.

Figure 4:
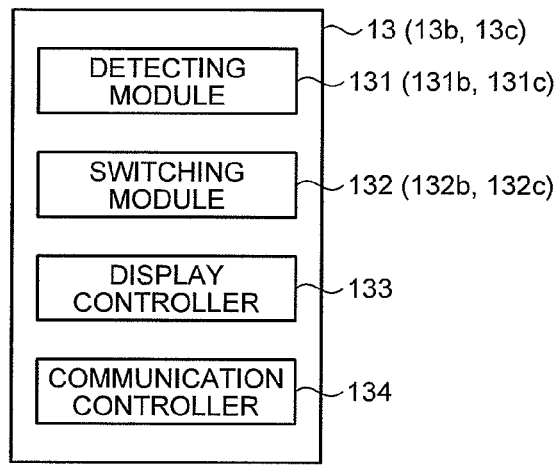
FIG. 4 is an exemplary block diagram illustrating the functional configuration of a controller of the display device in the first embodiment.

As FIG. 4 illustrates, the controller 13 is functionally configured with a detecting module 131, a switching module 132, a display controller 133, and a communication controller 134.

The detecting module 131 is configured to detect the condition of the power source supplied to the display device 100. Specifically, the detecting module 131 is configured to detect whether the power source is supplied from the AC power source 400 or from the battery 12.

The switching module 132 is configured to switch the EDID output to the mobile terminal 200 by controlling the MC 162 and the EDID processor 163 based on the detecting result of the detecting module 131.

Specifically, when image data is transmitted from the mobile terminal 200 to the display device 100 in the state where the display device 100 is being driven by a power source supplied from the AC power source 400, the switching module 132 is configured to control the MC 162 and the EDID processor 163 so that the high power-consumption EDID is output from the display device 100 to the mobile terminal 200 before the transmission of the image data is started. When image data is transmitted from the mobile terminal 200 to the display device 100 in the state where the display device 100 is being driven by a power source supplied from the battery 12, the switching module 132 is configured to control the MC 162 and the EDID processor 163 so that the low power-consumption EDID is output from the display device 100 to the mobile terminal 200 before the transmission of the image data is started. When a power source supplier is switched in the state where the transmission of image data from the mobile terminal 200 to the display device 100 has already been started, the switching module 132 is configured to perform control such as temporarily turning off an HPD signal output from the MC 162 and make the EDID processor 163 output another type of EDID, that is, EDID corresponding to the selected power source supplier.

The display controller 133 is configured to control the content displayed on the display 15. For example, the display controller 133 is configured to control the display 15 to display decoded image data output from the TMDS decoder 161. The communication controller 134 is configured to control transmission and receipt of image data between the mobile terminal 200 and the display device 100.

Processing executed by each module (see FIG. 4) of the controller 13 in the display device 100 according to the first embodiment will now be described with reference to FIG. 5.

Figure 5:
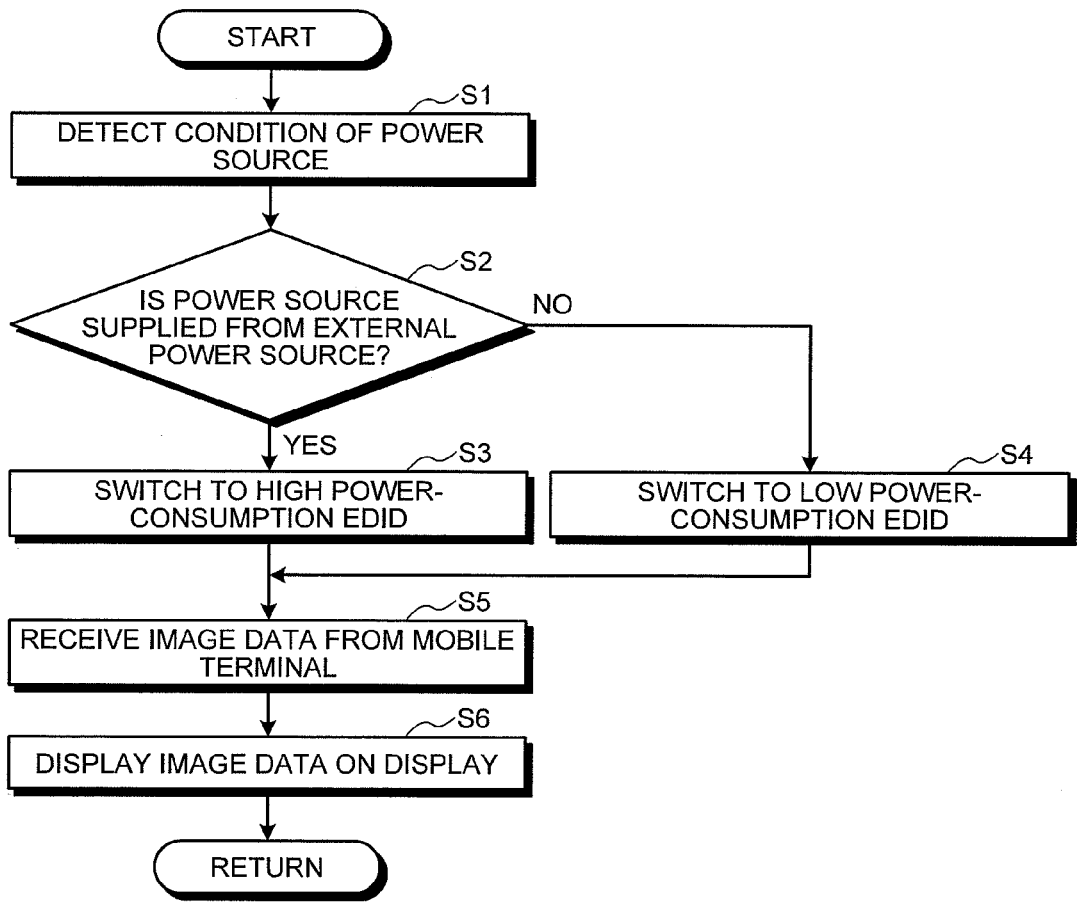
FIG. 5 is an exemplary flowchart for explaining processing executed by the controller of the display device in the first embodiment.

In the first embodiment, as FIG. 5 illustrates, at S1, the detecting module 131 detects the condition of a power source supplied to the display device 100. Specifically, the detecting module 131 detects whether the power source is supplied from the AC power source 400 or from the battery 12, and the process proceeds to S2.

At S2, based on the detecting result at S1, the switching module 132 determines whether the power source is supplied from the AC power source 400 serving as an external power source.

At S2, when the switching module 132 determines that the power source is supplied from the AC power source 400, the process proceeds to S3. At S3, the switching module 132 switches the EDID output to the mobile terminal 200 to the high power-consumption EDID out of two types of EDID stored in the EDID memory 164.

At S2, when the switching module 132 determines that the power source is not supplied from the AC power source 400, in other words, determines that the power source is supplied from the battery 12, the process proceeds to S4. At S4, the switching module 132 switches the EDID output to the mobile terminal 200 to the low power-consumption EDID. For example, when the power source is switched from the AC power source 400 to the battery 12, the switching module 132 controls the MC 162 to temporarily turn off a signal to be output to the HPD line and makes the EDID processor 163 output another type of EDID, that is, the low power-consumption EDID.

After the processing at S3 or S4 is completed, the process proceeds to S5. At S5, the communication controller 134 receives image data from the mobile terminal 200. The image data is in a format corresponding to the EDID output to the mobile terminal 200 at S3 or S4. The process thereafter proceeds to S6.

At S6, the display controller 133 displays the image data transmitted from the mobile terminal 200 on the display 15. A series of processing ends with this.

As described above, in the first embodiment, the EDID memory 164 stores therein a plurality of types of EDID (two types of EDID, which are the high power-consumption EDID and the low power-consumption EDID, in the above-described example). The controller 13 is configured to detect the condition of a power source supplied to the display device 100, and to switch the EDID output to the mobile terminal 200 based on the condition of the power source so that the power-consumption by displaying the image data on the display 15 is adjusted to the condition of the power source.

In the circumstance where the display device 100 is driven with the battery 12 as a power source, it is required to prolong the driving time of the display device 100 by saving the power-consumption. According to the first embodiment, when the display device 100 is driven with the battery 12 as a power source, the low power-consumption EDID is selected, thereby the driving time of the display device 100 can be prolonged. In the circumstance where the display device 100 is driven with the AC power source 400 as a power source, it is possible to output high-quality image data without concerning about the driving time of the display device 100. According to the first embodiment, when the display device 100 is driven with the AC power source 400 as a power source, the high power-consumption EDID is selected, the high power-consumption EDID being EDID for transmitting and receiving image data with higher resolution and a higher frame rate. This enables a higher-quality image to be output to the display device 100. As described above, the configuration according to the first embodiment can perform appropriate power saving according to the condition.

Modification of First Embodiment

A display device 100a (see FIG. 1) according to a modification of the first embodiment will now be described with reference to FIGS. 1, 6, and 7. The display device 100a is an example of an "electronic device".

In addition to the configuration of the first embodiment in which EDID is switched based on whether the power source supplied to the display device 100a originates from the AC power source 400 or from the battery 12, the display device 100a according to the modification is configured such that EDID can be switched according to the remaining level of the battery 12 when the display device 100a is being driven by the power supplied from the battery 12.

This means that not a single type but a plurality of types of low power-consumption EDID are employed in the modification, and power-consumption levels in these types of low power-consumption EDID differ in stages from each other.

Figure 6:
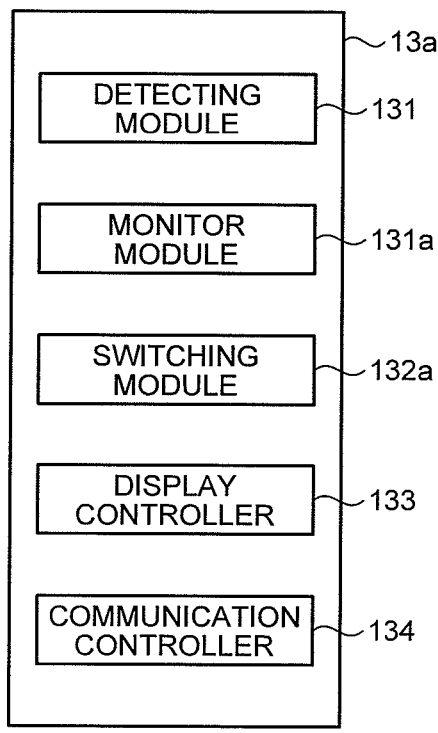
FIG. 6 is an exemplary block diagram illustrating the functional configuration of a controller of a display device according to a modification of the first embodiment.

As FIG. 6 illustrates, a controller 13a in the modification is functionally configured with the detecting module 131, a switching module 132a, the display controller 133, the communication controller 134, and a monitor module 131a. The monitor module 131a is configured to monitor the remaining level of the battery 12. The switching module 132a in the modification is configured to switch the EDID output to the mobile terminal 200 in stages between the types of low power-consumption EDID based on the monitoring result of the monitor module 131a so that the power-consumption decreases as the remaining level of the battery 12 lowers.

Other configurations of the modification are the same as those of the first embodiment.

Processing executed by each module (see FIG. 6) of the controller 13a in the modification will now be described with reference to FIG. 7. The processing indicated in FIG. 7 is executed when the display device 100a is driven by the power supplied from the battery 12.

Figure 7:
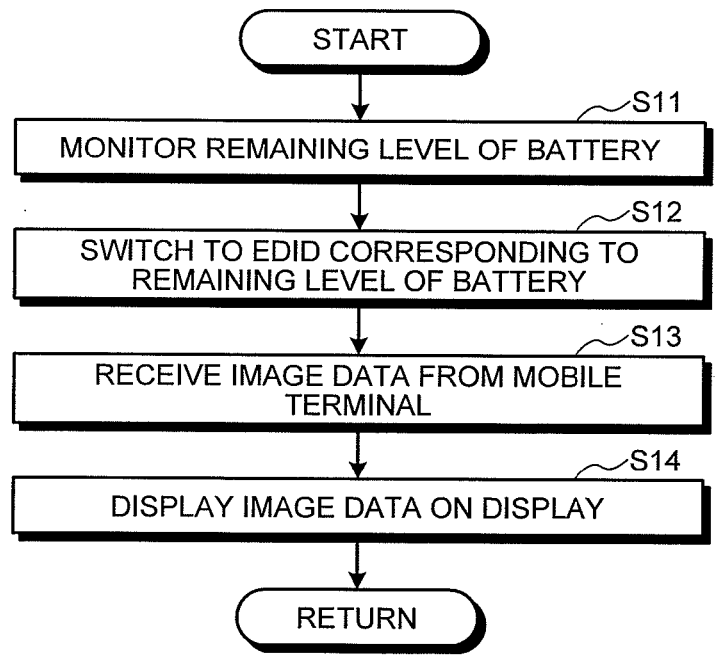
FIG. 7 is an exemplary flowchart for explaining processing executed by the controller of the display device in the modification of the first embodiment.

In the modification, as FIG. 7 illustrates, the monitor module 131a monitors the remaining level of the battery 12 at S11. The process proceeds to S12.

At S12, based on the monitoring result at S11, the switching module 132a switches the EDID output to the mobile terminal 200 to EDID corresponding to the remaining level of the battery 12. For example, when a plurality of thresholds are set as determination criteria to determine the remaining level of the battery 12, the switching module 132a compares the thresholds with the remaining level of the battery 12 and determines whether the EDID output to the mobile terminal 200 needs to be switched to another type of EDID with lower power-consumption EDID. When the switching module 132a determines that EDID needs to be switched, the switching module 132a controls the MC 162, the EDID processor 163, and others so that EDID, the power-consumption of which is lower than that of the current EDID by a single stage, is output to the mobile terminal 200. The process thereafter proceeds to S13.

At S13, the communication controller 134 receives image data from the mobile terminal 200. The image data is in a format corresponding to the EDID output to the mobile terminal 200 at S12. The process proceeds to S14.

At S14, the display controller 133 displays the image data transmitted from the mobile terminal 200 on the display 15. A series of processing ends with this.

As described above, in the modification, a plurality of types of low power-consumption EDID are provided in a stepwise manner. When the power source is supplied from the battery 12, the controller 13a is configured to monitor the remaining level of the battery 12, and to switch the EDID output to the mobile terminal 200 based on the remaining level so that the power-consumption decreases as the remaining level lowers. Thus, power saving when the power source is supplied from the battery 12 can be efficiently achieved and the driving time of the display device 100a can be efficiently prolonged.

Second Embodiment

A display device 100b (see FIGS. 8 to 10) according to a second embodiment will now be described with reference to FIG. 4 and FIGS. 8 to 11. The display device 100b is an example of an "electronic device".

The second embodiment uses a different trigger for switching EDID from that of the first embodiment. Unlike the first embodiment that switches EDID based on whether a power source supplier has been switched, the display device 100b according to the second embodiment is configured to switch EDID based on whether a display mode (a display style) of image data displayed on the display 15 has been switched.

Examples of the case where the display mode is switched include a case where the display size of an image IM1 is switched (see FIG. 8) because of screen division performed on the display 15 displaying the image IM1 in a full-screen mode, a case where the original image IM1 is hidden (see FIG. 9) because of the operation of switching the output image from the image IM1 originally displayed on the display 15 to a new image IM2, a case where the screen size in length×width of the display 15 is switched because of rotation of the display 15, and the like.

A detecting module 131b (see FIG. 4) of a controller 13b according to the second embodiment is configured to detect whether the display mode has been switched as described above. When the display mode has been switched, a switching module 132b is configured to switch the EDID output to the mobile terminal 200 based on the content of the switching.

Figure 8:
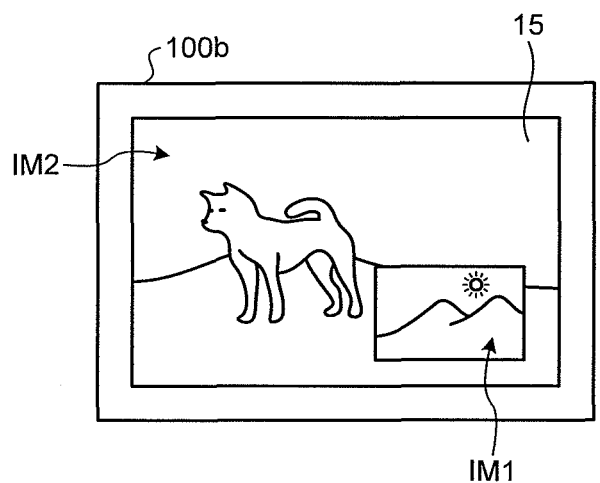
FIG. 8 is an exemplary diagram illustrating an example of a display mode of image data displayed on a display device according to a second embodiment.

For example, in the example illustrated in FIG. 8, the display size of the original image IM1 is decreased, and thus lowering the resolution and the frame rate of the image IM1 does not cause much trouble for viewers. Therefore, in this case, the switching module 132b is configured to switch the EDID output to the mobile terminal 200, which serves as a transmitter of image data corresponding to the image IM1, to EDID with lower power-consumption. On the other hand, when the display size of the image displayed on the display 15 is enlarged, the resolution and the frame rate of the image need to be increased. Therefore, in this case, the switching module 132b is configured to switch the EDID output to the mobile terminal 200, which serves as a transmitter of the image data, to EDID with higher power-consumption.

Figure 9:
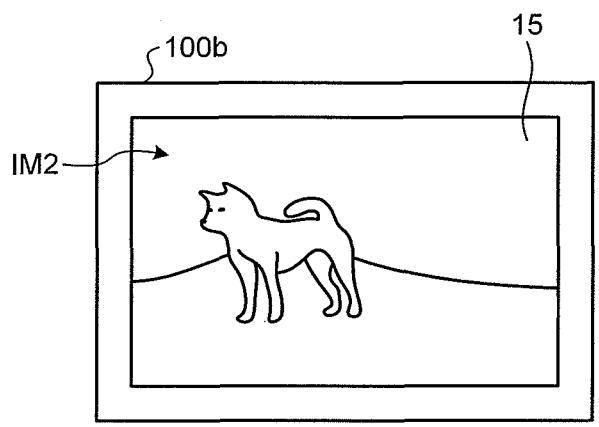
FIG. 9 is an exemplary diagram illustrating another example of a display mode of image data displayed on the display device in the second embodiment.

In the example illustrated in FIG. 9, because the image displayed on the display 15 has been switched from the IM1 to the IM2, the original image IM1 is accordingly hidden. Therefore, in this case, lowering the resolution and the frame rate of the image IM1 does not cause troubles for viewers. Thus, in this case, the switching module 132b is configured to switch the EDID output to the mobile terminal 200, which serves as a transmitter of image data corresponding to the image IM1, to EDID with lower power-consumption. Here, when the hidden image is redisplayed on the display 15, the resolution and the frame rate of the image need to be increased. Thus, in this case, the switching module 132b is configured to switch the EDID output to the mobile terminal 200, which serves as a transmitter of the image data, to EDID with higher power-consumption.

Figure 10:
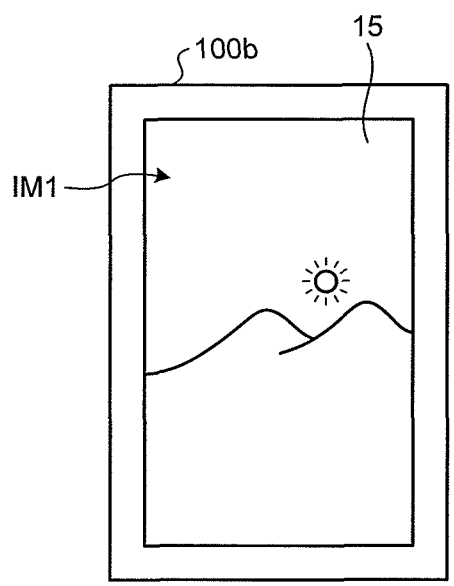
FIG. 10 is an exemplary diagram illustrating still another example of a display mode of image data displayed on the display device in the second embodiment.

In the example illustrated in FIG. 10, because the screen size in length×width of the display 15 has been changed, the resolution and the frame rate of the image IM1 need to be accordingly changed. Therefore, in this case, the switching module 132b is configured to switch the EDID output to the mobile terminal 200, which serves as a transmitter of image data corresponding to the image IM1, to EDID matching the current screen size.

Other configurations of the second embodiment are the same as those of the first embodiment.

Processing executed by each module (see FIG. 4) of the controller 13b according to the second embodiment will now be described with reference to FIG. 11.

Figure 11:
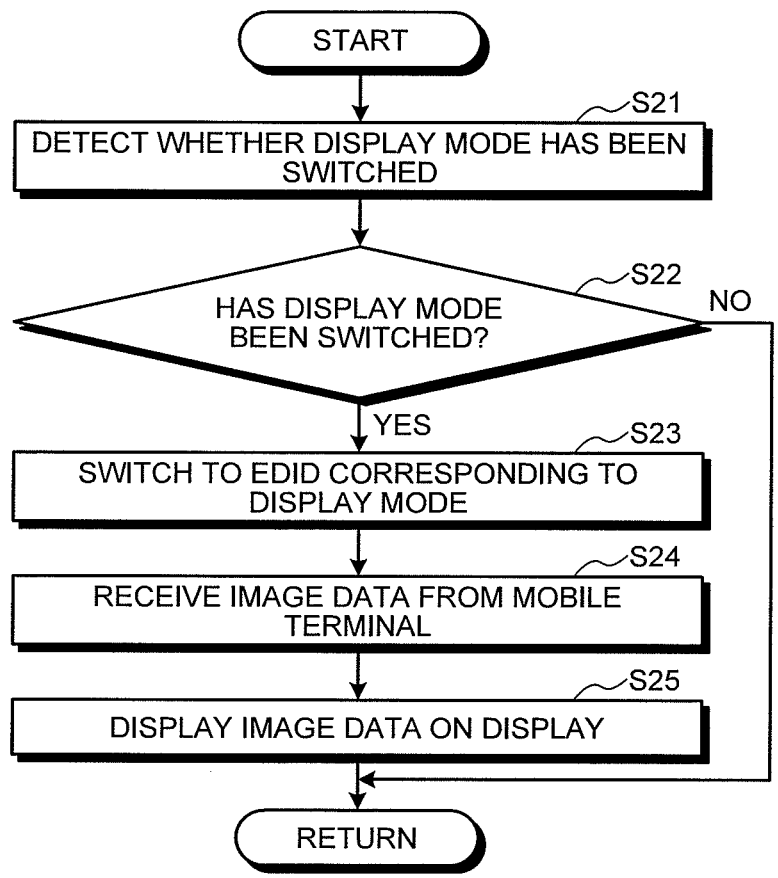
FIG. 11 is an exemplary flowchart for explaining processing executed by a controller of the display device in the second embodiment.

In the second embodiment, as FIG. 11 illustrates, the detecting module 131b detects at S21 whether the display mode of image data displayed on the display 15 has been switched. The process then proceeds to S22.

Based on the detecting result at S21, the switching module 132b determines at S22 whether the display mode has been switched. When the switching module 132b determines at S22 that the display mode has not been switched, the process ends. When the switching module 132b determines at S22 that the display mode has been switched, the process proceeds to S23.

At S23, the switching module 132b switches the EDID output to the mobile terminal 200, which serves as a transmitter of the image data, to EDID corresponding to the switched display mode. The process then proceeds to S24.

At S24, the communication controller 134 receives the image data from the mobile terminal 200. The image data is in a format corresponding to the EDID output to the mobile terminal 200 at S23. The process then proceeds to S25.

At S25, the display controller 133 displays the image data transmitted from the mobile terminal 200 on the display 15. A series of processing ends with this.

In the second embodiment, as described above, the controller 13b is configured to detect whether the display mode of image data displayed on the display 15 has been switched, and to switch the EDID output to the mobile terminal 200 based on the display mode so that the power-consumption by displaying the image data on the display 15 is adjusted to the display mode. Examples of the case where the display mode is switched include a switch of a display size (see FIG. 8), a switch from a display mode to a non-display mode (see FIG. 9), a switch of a screen size (see FIG. 10), and the like. According to the second embodiment, more appropriate power saving in response to a switch of a display mode can be achieved.

Third Embodiment

A display device 100c (see FIG. 12) according to a third embodiment will now be described with reference to FIGS. 4, 12, and 13. The display device 100c is an example of an "electronic device".

The third embodiment uses a different trigger for switching EDID from that of the first embodiment. Unlike the first embodiment that switches EDID based on whether the power source supplier has been switched, the display device 100c according to the third embodiment is configured to switch EDID based on whether someone is present in front of the display 15.

Figure 12:
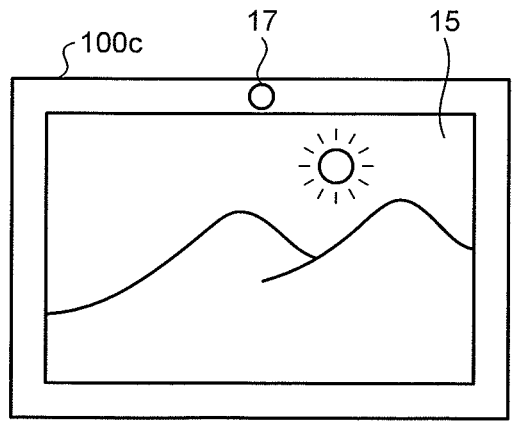
FIG. 12 is an exemplary diagram illustrating the appearance of a display device and a mobile terminal according to a third embodiment.

As FIG. 12 illustrates, the display device 100c according to the third embodiment comprises a motion sensor 17 including a camera and the like. A detecting module 131c (see FIG. 4) of a controller 13c according to the third embodiment is configured to detect whether someone is present in front of the display 15 with the motion sensor 17. A switching module 132c (see FIG. 4) is configured to switch the EDID output to the mobile terminal 200 based on whether someone is present in front of the display 15.

For example, when no one is present in front of the display 15, there is no necessity to increase the resolution and the frame rate of an image displayed on the display 15. Thus, in this case, the switching module 132c is configured to switch the EDID output to the mobile terminal 200 to EDID with lower resolution and a lower frame rate, that is, EDID with lower power-consumption. On the other hand, when someone is present in front of the display 15, higher resolution and a higher frame rate of the image are effective in viewing the image displayed on the display 15 better. Thus, in this case, the switching module 132c is configured to switch the EDID output to the mobile terminal 200 to EDID with higher resolution and a higher frame rate, that is, EDID with higher power-consumption.

Other configurations of the third embodiment are the same as those of the first embodiment.

Processing executed by each module (see FIG. 4) of the controller 13c according to the third embodiment will now be described with reference to FIG. 13.

In the third embodiment, as FIG. 13 illustrates, the detecting module 131c detects at S31 whether someone is present in front of the display 15 with the motion sensor 17 (see FIG. 12). The process proceeds to S32.

Based on the detecting result at S31, the switching module 132c determines at S32 whether someone is present in front of the display 15.

At S32, when the switching module 132c determines that no one is present in front of the display 15, the process proceeds to S33. At S33, the switching module 132c switches the EDID output to the mobile terminal 200, which serves as a transmitter of image data, to EDID with lower resolution and a lower frame rate, that is, EDID with lower power-consumption.

When the switching module 132c determines at S32 that someone is present in front of the display 15, the process proceeds to S34. At S34, the switching module 132c switches the EDID output to the mobile terminal 200, which serves as a transmitter of image data, to EDID with higher resolution and a higher frame rate, that is, EDID with higher power-consumption.

After the processing at S33 or S34 is completed, the process proceeds to S35. At S35, the communication controller 134 receives image data from the mobile terminal 200. The image data is in a format corresponding to the EDID output to the mobile terminal 200 at S33 or S34. The process then proceeds to S36.

At S36, the display controller 133 displays the image data transmitted from the mobile terminal 200 on the display 15. A series of processing ends with this.

In the third embodiment, as described above, the controller 13c is configured to detect whether someone is present in front of the display 15 with the motion sensor 17, and to switch the EDID output to the mobile terminal 200 based on the detecting result of the motion sensor 17 so that the power-consumption when no one is present in front of the display 15 is smaller than that when someone is present in front of the display 15. This makes it possible, for example, to switch to EDID with lower resolution and a lower frame rate, that is, EDID with lower power-consumption when no one is present in front of the display 15, and to switch to EDID with higher resolution and a higher frame rate, that is, EDID with higher power-consumption when someone is present in front of the display 15. Thus, more appropriate power saving according to the condition can be achieved.

In the above description, techniques of the embodiments and the modification are applied to an external display device connected to a mobile terminal; however, these techniques are applicable to a common display device such as a television device other than an external display device. Furthermore, these techniques are also applicable to a common electronic device other than a display device as long as the electronic device is capable of transmitting and receiving characteristic information such as EDID.

The computer program executed by the controllers 13 and 13a to 13c according to the embodiments and the modification is stored in a read-only memory (ROM) and the like of the memory 14. The computer program is provided as an installable or an executable computer program product. In specific, the computer program is embedded and provided in a computer program product including a memory medium that is non-temporary and readable by a computer such as a compact disc read only memory (CD-ROM), a flexible disk (FD), a compact disc recordable (CD-R), and a digital versatile disc (DVD).

The computer program may be stored in a computer connected to a network such as the Internet and provided or distributed via the network. The computer program may be preliminarily embedded in a ROM and the like and provided.

The computer program is configured with modules. With the controller 13 reading the computer program from a ROM of the memory 14 and executing the computer program, each module as illustrated in FIGS. 4 and 6 is generated on a random access memory (RAM) of the memory 14.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus capable of communicating with a first electronic apparatus and cable-connected with the first electronic apparatus, comprising:
   a battery;
   an interface configured to connect with an external power source;
   processing circuitry configured to determine whether a power source of the electronic apparatus is supplied from the battery or the external power source via the interface;
   a transmitter configured to:
      transmit a first extended display identification data (EDID) indicating a first capability to display a content on the electronic apparatus to the first electronic apparatus when the power source of the electronic apparatus is supplied from the external power source via the interface; and transmit a second extended display identification data (EDID) indicating a second capability to display the content on the electronic apparatus to the first electronic apparatus when the power source of the electronic apparatus is supplied from the battery, wherein the second EDID is different from the first EDID, and power-consumption of displaying the content according to the second capability is smaller than the power-consumption of displaying the content according to the first capability; and a receiver configured to:

receive first video data in accordance with the first EDID and the first capability from the first electronic apparatus when the power source of the electronic apparatus is supplied from the external power source via the interface; and receive second video data in accordance with the second EDID and the second capability from the first electronic apparatus when the power source of the electronic apparatus is supplied from the battery.

2. The electronic apparatus of claim 1, wherein
the processing circuitry is further configured to determine magnitude relationship between a remaining level of the battery and a first value to select the second EDID or a third EDID, when the power source of the electronic apparatus is supplied from the battery.

3. An electronic apparatus capable of communicating with a first electronic apparatus and cable-connected with the first electronic apparatus, the electronic apparatus comprising:

a memory configured to store therein a plurality of distinct types of extended display identification data (EDID) having different power-consumption levels and capability levels to display a content on the electronic apparatus;

a transmitter configured to transmit one EDID among the plurality of distinct types of EDID to the first electronic apparatus;

a receiver configured to receive video data in accordance with the one EDID from the first electronic apparatus; and a processing circuitry configured to detect whether a display mode of the video data is changed, and to make the transmitter switch the one EDID to have a specific power-consumption level and a specific capability level corresponding to the display mode.

4. The electronic apparatus of claim 3, wherein
the processing circuitry is configured to detect whether a display size of the video data is changed caused by screen division, and to make the transmitter switch the one EDID in response to change of the display size.

5. The electronic apparatus of claim 3, wherein
the processing circuitry is configured to detect whether the video data transmitted from the first electronic apparatus has been hidden by another video data, and to make the transmitter switch the one EDID in response to hiding of the video data such that the power-consumption in displaying the video data is most decreased.

6. The electronic apparatus of claim 3, wherein
the processing circuitry is configured to detect whether a horizontal size and a vertical size of a screen is changed caused by a rotation of the display, and to make the transmitter switch the one EDID in response to change of the screen size.

7. An electronic apparatus capable of communicating with a first electronic apparatus and cable-connected with the first electronic apparatus, the electronic apparatus comprising:

a memory configured to store therein a plurality of distinct types of extended display identification data (EDID) having different power-consumption levels and capability levels to display a content on the electronic apparatus;

a transmitter configured to transmit one EDID among the plurality of distinct types of EDID to the first electronic apparatus;

a receiver configured to receive video data in accordance with the one of the EDID from the first electronic apparatus; and a processing circuitry configured to detect with a sensor whether someone is present or absent in front of a display, and to make the transmitter switch the one EDID to have a specific power-consumption level and a specific capability level in response to presence or absence of the someone in front of the display.

8. A method of an electronic apparatus capable of communicating with a first electronic apparatus and cable-connected with the first electronic apparatus, the method comprising:

determining whether a power source of the electronic apparatus is supplied from a battery or an external power source via an interface;

transmitting a first extended display identification data (EDID) indicating a first capability to display a content on the electronic apparatus to the first electronic apparatus when the power source of the electronic apparatus is supplied from the external power source via the interface;

transmitting a second extended display identification data (EDID) indicating a second capability to display the content on the electronic apparatus to the first electronic apparatus when the power source of the electronic apparatus is supplied from the battery, wherein the second EDID is different from the first EDID, and power-consumption of displaying the content according to the second capability is smaller than the power-consumption of displaying the content according to the first capability;

receiving first video data in accordance with the first EDID and the first capability from the first electronic apparatus when the power source of the electronic apparatus is supplied from the external power source via the interface; and receiving second video data in accordance with the second EDID and the second capability from the first electronic apparatus when the power source of the electronic apparatus is supplied from the battery.

9. The method of claim 8, further comprising:
determining magnitude relationship between a remaining level of the battery and a first value to select the second EDID or a third EDID, when the power source of the electronic apparatus is supplied from the battery.

* * * * *